United States Patent
Buermann et al.

[19]

[11] Patent Number: 5,880,831
[45] Date of Patent: Mar. 9, 1999

[54] REFLECTANCE SPECTROPHOTOMETRIC APPARATUS WITH OPTICAL RELAY

[75] Inventors: Dale Buermann, Los Altos; Abdul Rahim Forouhi; Michael J. Mandella, both of Cupertino, all of Calif.

[73] Assignee: n & k Technology, Inc., Santa Clara, Calif.

[21] Appl. No.: 987,907

[22] Filed: Dec. 9, 1997

[51] Int. Cl.$^6$ .................................. G01J 3/02; G01J 3/42
[52] U.S. Cl. ..................... 356/319; 356/326; 356/371; 356/381
[58] Field of Search .................... 356/319, 323, 356/325, 326, 328, 445, 446, 371, 381

[56] References Cited

U.S. PATENT DOCUMENTS

| | | | |
|---|---|---|---|
| 3,022,704 | 2/1962 | Cary | 356/325 |
| 3,157,788 | 11/1964 | Roche | 356/326 |
| 4,453,225 | 6/1984 | Ford | 356/325 |
| 4,740,082 | 4/1988 | Young | 356/346 |
| 4,784,487 | 11/1988 | Hopkins, II et al. | 356/326 |
| 5,214,286 | 5/1993 | Milsevic et al. | 356/326 |
| 5,430,634 | 7/1995 | Baker et al. | 362/32 |

OTHER PUBLICATIONS

Sasian, J. et al., *Double–curvature surfaces in mirror system design*, Opt. Eng., vol. 36, No. 4. 1997.

*Primary Examiner*—F. L. Evans
*Attorney, Agent, or Firm*—Lumen Intellectual Property Services

[57] ABSTRACT

The invention comprises an apparatus for characterizing a thin film using the reflected spectrum of the film. The apparatus uses two toroidal mirrors in an optical relay to direct light onto the thin film and to direct reflected light from the film to a spectrophotometer. A computer then analyzes the reflected spectrum to characterize the optical properties of the thin film. The optical relay allows for a range of angles of incidence upon the sample, and has no chromatic aberration.

20 Claims, 5 Drawing Sheets

REFLECTANCE SPECTROPHOTOMETRIC APPARATUS WITH OPTICAL RELAY

FIELD OF THE INVENTION

The present invention generally relates to the characterization of the optical properties of materials, and in particular to an apparatus without chromatic aberration that uses reflectance spectrophotometry to characterize thin films.

BACKGROUND

Recent advances in thin film technology have made it increasingly important to be able to accurately measure the characteristics of thin films. The thin film properties of interest include:

Thickness, d

Index of Refraction, n

Extinction Coefficient, k

Energy Bandgap, $E_g$

Interface Roughness, $\sigma$

The index of refraction n and the extinction coefficient k depend on the energy E of the photons involved; i.e., n=n(E) and k=k(E). The index of refraction n(E) describes how light is diffracted by a material. In similar materials, n(E) scales with the density of the material. The extinction coefficient, k(E), relates to the absorption of light. A material with a large extinction coefficient absorbs more light than a material with a small extinction coefficient. Transparent materials have an extinction coefficient of zero in the visible range of light. The energy bandgap, $E_g$, represents the minimum photon energy needed for a direct electronic transition from the valence to the conduction band; i.e., for $E<E_g$, absorption of light due to direct electronic transitions is zero.

In general, determination of the above quantities is a non-trivial problem. The n(E) and k(E) spectra of a film cannot be measured directly, but must be deduced from optical measurements. U.S. Pat. No. 4,905,170 by Forouhi and Bloomer discloses a method for determining these spectra from the reflectance spectrum of the film. Their method involves shining light onto the film and observing how much light is reflected back. The reflectance spectrum, R(E), is defined as the ratio of the reflected intensity to the incident intensity of light. R(E) depends on the angle of incidence $\theta$ of the light upon the film, as well as the film thickness d, the indices of refraction and extinction coefficients $n_f(E)$ and $k_f(E)$ of the film, $n_s(E)$ and $k_s(E)$ of the substrate, the band gap energy of the film $E_g$, and the interface roughness $\sigma_1$ and $\sigma_2$ of both the top and the bottom of the film. To characterize any film, it is necessary to de-convolute the optical measurement R(E) into its intrinsic components d, $n_f(E)$, $k_f(E)$, $n_s(E)$, $k_s(E)$, $E_g$, $\sigma_1$ and $\sigma_2$.

The above patent by Forouhi and Bloomer incorporates a formulation for the optical constants n(E) and k(E), along with a parameterized model for interface roughness, into the Fresnel coefficients associated with films on a substrate (found in standard texts) to generate an algorithm that describes the theoretical reflectance; i.e., $$R_{theory}=R_{theory}(E, \theta, d, n_f(E), k_f(E), n_s(E), k_s(E), E_g, \sigma_1, \sigma_2)$$

By comparing the resultant equation for theoretical reflectance with the actual measurement of broad-band reflectance, the required parameters for thin film characterization d, $n_f(E)$, $k_f(E)$, $E_g$, and $\sigma_1$ and $\sigma_2$ can be determined.

To measure the reflectance R(E), light must be generated by a source and reflected by the sample into a spectrophotometer. Typically, lenses are used to build an optical relay that directs the light from the source to the sample, and from the sample to the spectrophotometer. (An optical relay is a device that produces an image at one point from a source at another point.) The many different materials used in the fabrication of coatings have characteristic reflectance peaks that range from the ultraviolet to the infrared. Therefore, the reflectance spectrum of the sample should be measured for wavelengths in the range from about 190 nm to 1000 nm. Unfortunately, over this wide range of wavelengths, simple lenses exhibit a significant amount of chromatic aberration: the focal length typically changes by about 20% from one end of the spectrum to the other. Therefore any optical relay using lenses will be more efficient at some wavelengths than at others. This means that the measured spectrum will be distorted.

U.S. Pat. No. 4,784,487 by Hopkins and Willis describes an optical relay for spectrophotometric measurements that partially compensates for this chromatic aberration by a skillful use of apertures. There are two difficulties with this relay in the present context. First, the relay was developed for transmittance rather than reflectance measurements. Even if the relay is adapted for reflectance measurements, however, it will still be extremely sensitive to small misalignments. This is because when the light beam is reflected by the sample and focused onto the entrance slit of the spectrophotometer, the pencil of light entering the spectrophotometer is not chromatically homogeneous, but is, for example, red in the center and blue toward the edges. If a misalignment occurs, the input beam is no longer exactly centered on the entrance slit, and not only does the intensity of measured light decrease, but the relative ratio of blue to red changes. This is disastrous to the above method of characterizing thin films, since the method relies on measuring all parts of the reflected spectrum equally well. Small and unavoidable misalignments therefore lead to incorrect characterizations of the thin film.

Furthermore, it is desirable for an optical relay used for thin film characterization to have as few components as possible to minimize the opportunities for misalignment and to minimize the light lost by reflections from each surface. It is also desirable to use an optical relay that allows light to strike the sample with a range of angles of incidence, this range being chosen to simplify the interpretation of the reflectance R(E) in terms of thin film properties.

OBJECTS AND ADVANTAGES

Accordingly, it is a primary object of the present invention to provide an apparatus for thin film characterization using reflectance spectrophotometry that is not sensitive to small changes in alignment.

Further objects and advantages of this invention are to provide a reflectance spectrophotometric apparatus that:

(a) is equally efficient at all wavelengths, thereby increasing the accuracy of the measurements;

(b) comprises as few components as possible, thereby minimizing spurious loss of light and reducing the opportunity for misalignment; and (c) can provide for an adjustable range of angles of incidence of light upon the sample being studied.

SUMMARY

The invention comprises an optical relay using two toroidal mirrors for reflectance spectrophotometry measurements. Since the relay contains no lenses, there is no chromatic aberration present; therefore the measured spectral shape is insensitive to small changes in the alignment of the optical components.

The invention comprises an optical relay that is equally efficient at all wavelengths. The relay uses a minimum of components, and can be adjusted for any desired range of angles of incidence of light upon the sample studied.

DETAILED DESCRIPTION

Figure 1:
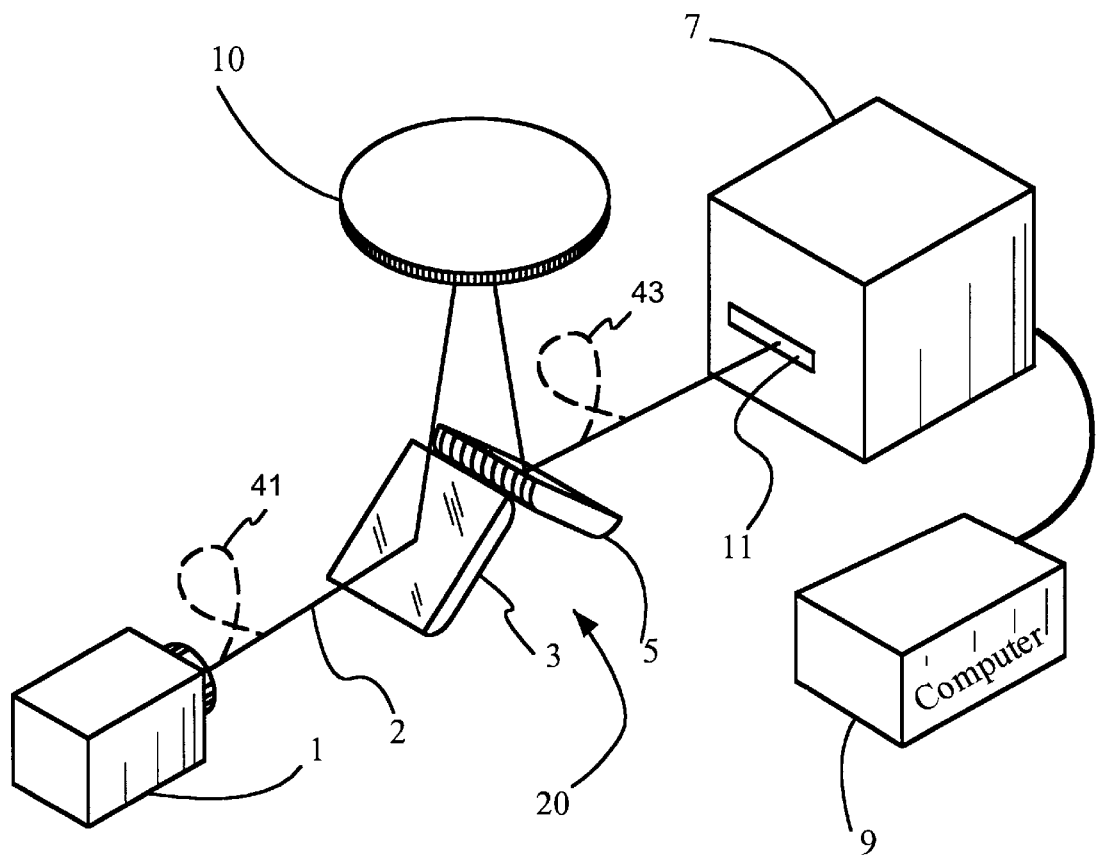
FIG. 1 shows the primary embodiment of the invention.

FIG. 1 shows the primary embodiment of the invention. A light source 1 emits a light beam 2 having a broad spectrum. Beam 2 is reflected by a source mirror 3 onto a sample 10. Sample 10 comprises a substrate and at least one thin film deposited onto the substrate. Source mirror 3 not only reflects beam 2 onto sample 10 but also focuses beam 2 onto sample 10.

Beam 2 is reflected from sample 10 and strikes a detector mirror 5. Mirror 5 reflects and focuses beam 2 onto an entrance slit 11 of a spectrophotometer 7. Mirrors 3 and 5 comprise an optical relay 20 for directing light from source 1 to sample 10 and then from sample 10 to slit 11.

The spectrum of beam 2 is measured by a spectrophotometer 7 and the result is electronically transmitted to a computer 9. Computer 9 compares the measured spectrum of beam 2 with a theoretical prediction of the same spectrum based on parameters that model the properties of sample 10. Computer 9 adjusts these parameters to fit the theoretical spectrum to the observed spectrum. The thin film of sample 10 is then characterized in terms of the parameters that best fit the observed reflected spectrum.

Figure 2:
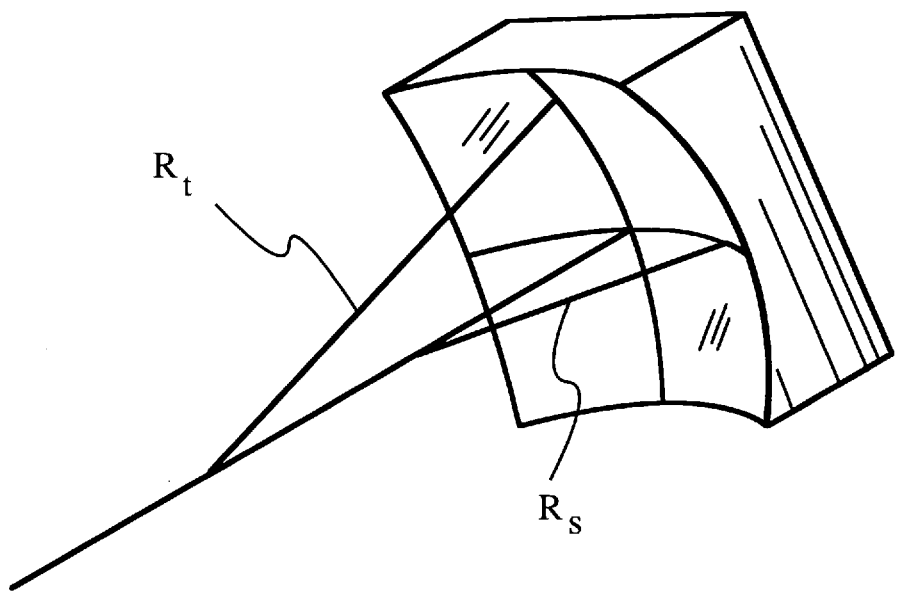
FIG. 2 shows a toroidal mirror.

Mirrors 3 and 5 must serve the dual role of both reflecting and focusing beam 2. To accomplish this, mirrors 3 and 5 are concave. In fact, mirrors 3 and 5 are toroidal, meaning they have two different radii of curvature. The plane containing beam 2 is called the tangential plane. The plane orthogonal to the tangential plane and containing the normal to the center of the mirror 3 is called the sagital plane of mirror 3. FIG. 2 shows a generic toroidal mirror having two radii of curvature: a radius of curvature in the tangential plane, $R_t$, and a radius of curvature in the sagital plane, $R_s$.

Figure 3:
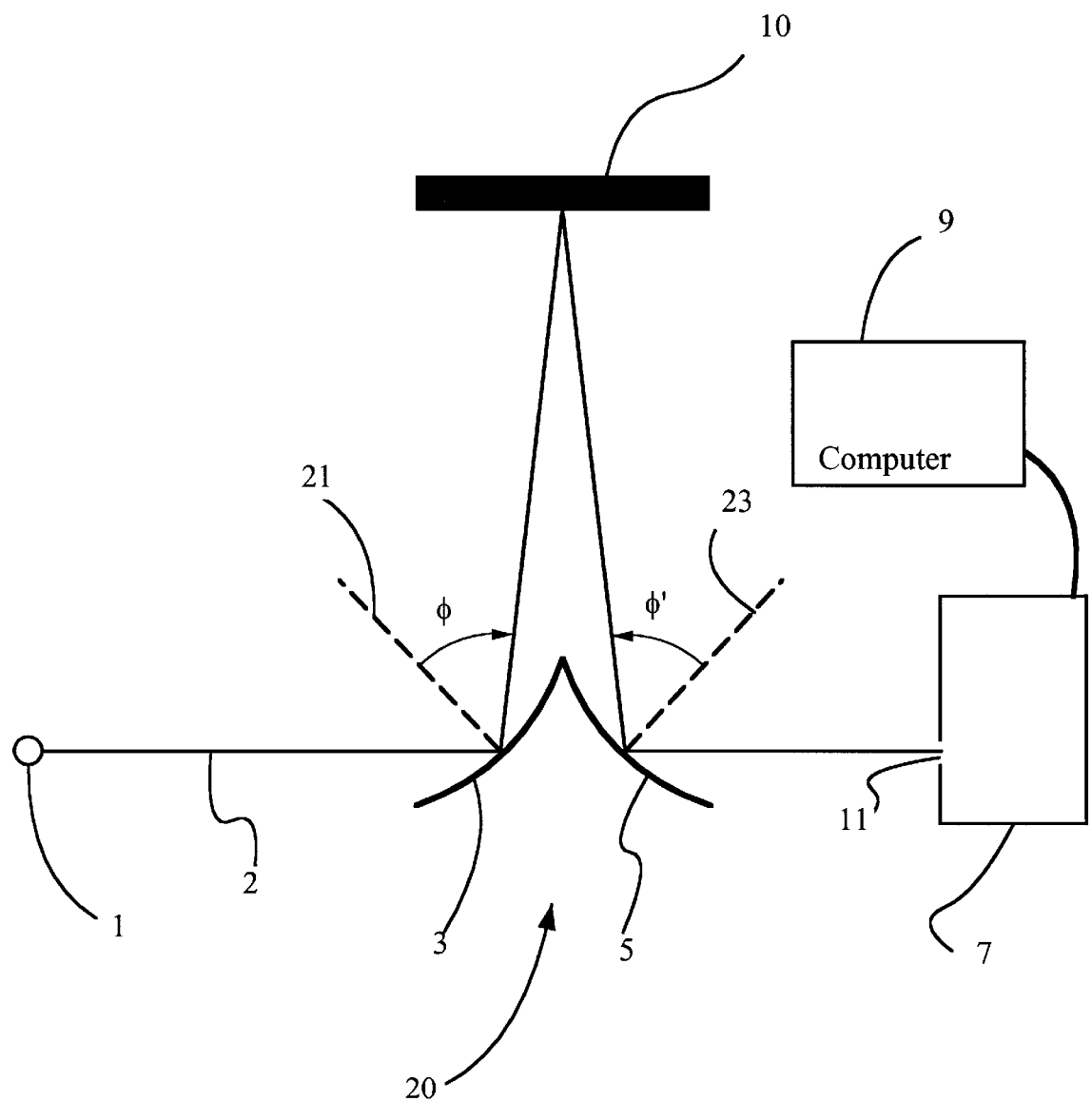
FIG. 3 is a side view of the primary embodiment.

FIG. 3 shows a two dimensional view of the primary embodiment. The plane of the page is the tangential plane. A normal 21 is drawn through the center of mirror 3 normal to mirror 3. The sagital plane of mirror 3 is the plane that contains normal 21 and is orthogonal to the tangential plane. Beam 2 is reflected from mirror 3 with an angle $\phi$ with respect to normal 21. The ratio of the sagital to tangential radius of curvature, $R_s/R_t$, that should be used for mirror 3 is given by $$\cos \phi = (R_s/R_t)^{1/2}$$

Similarly, a normal 23 is drawn through the center of mirror 5 normal to mirror 5. The sagital plane of mirror 5 is the plane that contains normal 23 and is orthogonal to the tangential plane. Beam 2 has an angle of incidence $\phi'$ with respect to normal 23 upon mirror 5. The radii of curvature $R_s'$ and $R_t'$ of mirror 5 are related by $$\cos \phi' = (R_s'/R_t')^{1/2}$$

Figure 4:
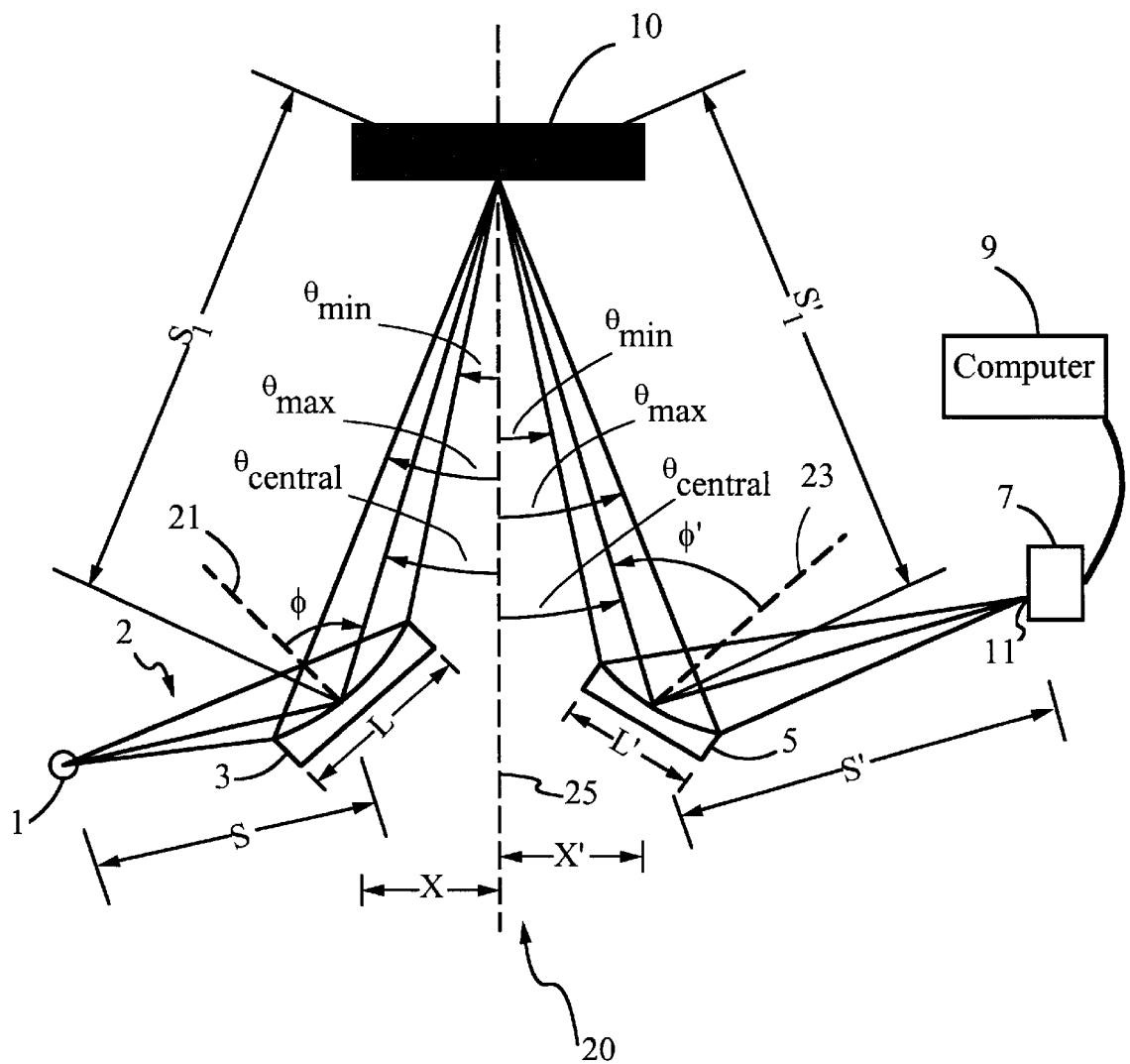
FIG. 4 is a more detailed view of the invention, showing the interrelation of various parameters.

In the primary embodiment of FIG. 3, mirrors 3 and 5 are identical, and $\phi=\phi'$. However, a more general arrangement is possible. FIG. 4 shows how to design relay 20 for arbitrary geometry. FIG. 4 also shows in detail how beam 2 is focused by mirror 3 onto sample 10; and how after being reflected by sample 10, beam 2 is focused by mirror 5 onto slit 11. The center of beam 2 travels a distance s from source 1 to the center of mirror 3; beam 2 then travels a distance $s_1$ to sample 10. The sagital radius of curvature $R_s$ of mirror 3 is then given by $$2 \cos \phi / R_s = (1/s_1) + (1/s).$$

Similarly, the distance between the point where beam 2 strikes sample 10 and the center of mirror 5 is $s_1'$, and the distance between the center of mirror 5 and slit 11 is $s'$. These distances are related to the sagital radius of curvature $R_s'$ of mirror 5 by $$2 \cos \phi' / R_s' = (1/s_1') + (1/s').$$

Referring again to FIG. 4, a normal 25 is drawn through the point where beam 2 strikes sample 10; normal 25 is normal to sample 10. Due to the focusing of beam 2, beam 2 has a range of angles of incidence with respect to normal 25 upon sample 10, the angles ranging from $\theta_{min}$ to $\theta_{max}$. Mirror 3 has a length L and mirror 5 has a length L'. Mirrors 3 and 5 also have lateral distances x and x' from normal 25.

From FIG. 4 and elementary geometry, it is evident how L, x, $s_1$, L', x', and $s_1'$ may be adjusted to obtain any desired angles $\theta_{min}$ and $\theta_{max}$. In practice a $\theta_{max}$ of less than 10° is used in order to simplify subsequent analysis, since for such a small $\theta_{max}$, the reflectance at each angle between $\theta_{min}$ and $\theta_{max}$ is approximately the same. (At a larger angle $\theta_{max}$, one would have to take into account the fact that not all of beam 2 approaches sample 10 at the same angle.) Furthermore, for $\theta_{max} \leq 10°$, the reflectance is approximately independent of the polarization of beam 2.

The sample numerical aperture (N.A.) of relay 20 may be defined as:

$$N.A._{sample} = \sin[(\theta_{max} - \theta_{min})/2]$$

Figure 5:
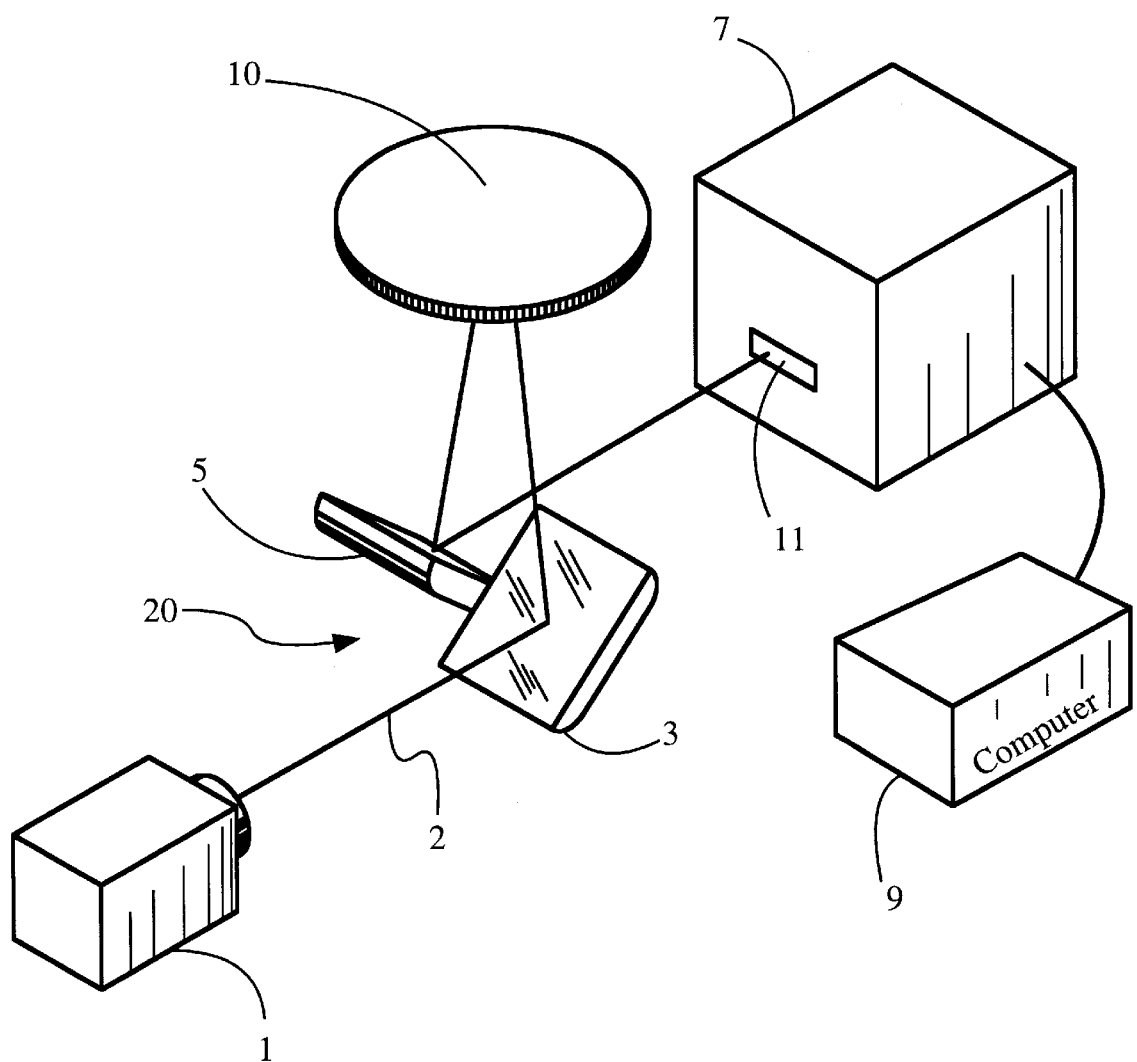
FIG. 5 shows another embodiment of the invention.

This numerical aperture represents the spread of angles of incidence of the cone of rays impinging on sample 10 with an angle of incidence given by: $\theta_{central} = (\theta_{max} + \theta_{min})/2$. FIG. 5 shows another embodiment of the invention. In this embodiment, mirrors 3 and 5 are placed side by side, thereby giving an alternate geometry to beam 2.

The reflected spectrum of beam 2 is gathered by spectrophotometer 7; it is well known in the art how to obtain a value for the absolute reflectance R(E) of sample 10 given the reflected spectrum gathered by spectrophotometer 7. Techniques include replacing sample 10 with a reference sample having a known reflectance, and comparing the reflected spectrum of the reference sample with the reflected spectrum of sample 10.

The spectrum gathered by spectrophotometer 7 is output to computer 9. Computer 9 compares this data with a particular theoretical model for the spectrum. For example, for an amorphous material the extinction coefficient k(E) may be modeled as $$k(E) = A(E - E_g)^2 / (E^2 BE + C)$$

where A is a probability term related to the probability that an electron will undergo a transition from an initial to a final state in the sample; B is an energy term related to the difference between the initial and final energies of an electron in the sample; and C is a lifetime term related to the time that an electron in the sample will remain in the final state. $E_g$ is the bandgap energy of the sample. From the model of the extinction coefficient, the index of refraction n(E) can be determined using the well-known dispersion relations.

The reflectance R(E) is related to n(E) and k(E) in a well-defined way. Computer 9 finds the parameters A, B, C, and $E_g$ that best fit the reflectance spectrum detected by spectrophotometer 7 using any standard curve-fitting routine. The properties n(E) and k(E) are in this way determined.

For the accurate determination of the optical properties of sample 10, it is important that source 1 emit a broadband beam (a beam containing a wide spectrum of light.) Because relay 20 contains no components with chromatic aberration, each part of the spectrum of beam 2 is focused equally onto entrance slit 11. Therefore if there is a slight misalignment of mirror 3 or mirror 5, beam 2 may walk across slit 11, causing a change in overall measured intensity, but the measured relative intensities of the different wavelengths of the spectrum will remain unchanged. Additionally, a misadjustment of sample 10 will cause relatively little misalignment of beam 2 with respect to slit 11, since beam 2 is focused to a point on sample 10.

Sample 10 comprises a substrate and a thin film. In the preferred applications, the substrate comprises silicon, glass, or a magnetic disk. The thin film comprises a nitride such as titanium nitride, an oxide, or amorphous silicon. The thin film may in fact comprise several layers of different substances.

Variations of the above apparatus are possible; for example, a first optical fiber 41 may be used to deliver beam 2 from source 1 to source mirror 3, as shown in FIG. 1. Furthermore, a second optical fiber 43 may be used to deliver beam 2 from detector mirror 5 to slit 11. Such fiber optic techniques are well known in the art. Accordingly, the scope of the invention should be determined by the following claims and their legal equivalents.

We claim:

1. An apparatus for determining optical properties of a material, said apparatus comprising:
   a) a spectrophotometer,
   b) an optical relay comprising:
      i) a first toroidal mirror for collecting light from a source and directing said light to said material, a portion a said light being reflected by said material, and
      ii) a second toroidal mirror for collecting said reflected portion of light and directing said reflected portion to said spectrophotometer; and
   c) a data processor for employing said reflected portion of light received by said spectrophotometer to calculate:
      i) an index of refraction of said material, and
      ii) an extinction coefficient of said material.

2. The apparatus of claim 1 wherein said extinction coefficient is calculated as a function of energy and as a function of:
   i) a probability term related to the probability that an electron transition will occur from an initial state to a final state for the material,
   ii) an energy term related to the difference in energy between the initial state and the final state for the material, and
   iii) a lifetime term related to the lifetime that electrons tend to remain in the final state for the material.

3. The apparatus of claim 1, wherein said light strikes said material with a plurality of angles of incidence, said angles lying in the range between 0 degrees and 10 degrees.

4. The apparatus of claim 1, wherein said optical relay additionally comprises an optical fiber for guiding said light from said source to said first toroidal mirror.

5. The apparatus of claim 1, wherein said optical relay additionally comprises and optical fiber for guiding said reflected portion of light from said second toroidal mirror to said spectrophotometer.

6. The apparatus of claim 1, wherein said material comprises a thin film.

7. The apparatus of claim 6, wherein said thin film comprises multiple layers.

8. The apparatus of claim 6, wherein said thin film comprises a material selected from the group consisting of: nitrides, oxides, and amorphous silicon.

9. An apparatus for characterizing optical properties of a sample, the apparatus comprising:
   a) a light source that emits a broadband optical beam,
   b) a spectrophotometer,
   c) a first toroidal mirror for focusing said optical beam onto said sample,
   d) a second toroidal mirror for collecting light reflected from said sample and directing said light into said spectrophotometer, said spectrophotometer converting said light into digital data,
   e) a computer for analyzing said data to determine:
      i) an index of refraction as a function of energy n(E) of said sample, and
      ii) an extinction coefficient as a function of energy k(E) of said sample.

10. The apparatus of claim 9, wherein said computer compares said data with a theoretical model for said data, said model comprising:
   i) a probability term related to a probability that an electron transition will occur from an initial state to a final state for said sample,
   ii) an energy term related to a difference in energy between the initial state and the final state for said sample, and
   iii) a life-time term related to the life-time that electrons tend to remain in the final state for said sample;
   whereby the probability, energy, and life-time terms that best describe said data may be determined.

11. The apparatus of claim 9, wherein said optical beam has a plurality of angles of incidence upon said sample, said angles of incidence lying in the range between 0 degrees and 10 degrees.

12. The apparatus of claim 9, additionally comprising an optical fiber for guiding said optical beam to said first toroidal mirror.

13. The apparatus of claim 9, additionally comprising an optical fiber for guiding said reflected light from said second toroidal mirror into said spectrophotometer.

14. The apparatus of claim 9, wherein said first toroidal mirror is substantially identical to said second toroidal mirror.

15. The apparatus of claim 9, wherein said broadband optical beam comprises light having a plurality of wavelengths, said wavelengths lying in the range between 190 nanometers and 1000 nanometers.

16. The apparatus of claim 9, wherein said sample comprises a thin film on a substrate.

17. The apparatus of claim 16, wherein said thin film has multiple layers.

18. The apparatus of claim 16, wherein said substrate comprises a substance selected from the group consisting of: silicon, glass, and a magnetic disk.

19. The apparatus of claim 16, wherein said thin film comprises a material selected from the group consisting of: nitrides, oxides, and amorphous silicon.

20. The apparatus of claim 9 wherein a property of said sample is determined, said property being selected from the group consisting of: energy bandgap $E_g$, thickness, and surface roughness $\sigma$.

* * * * *